(12) United States Patent
Miyazaki

(10) Patent No.: US 8,258,213 B2
(45) Date of Patent: Sep. 4, 2012

(54) RUBBER COMPOSITION FOR BREAKER TOPPING

(75) Inventor: Tatsuya Miyazaki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 197 days.

(21) Appl. No.: 12/682,152

(22) PCT Filed: Nov. 14, 2008

(86) PCT No.: PCT/JP2008/070763
§ 371 (c)(1), (2), (4) Date: Apr. 8, 2010

(87) PCT Pub. No.: WO2009/072382
PCT Pub. Date: Jun. 11, 2009

(65) Prior Publication Data
US 2010/0227955 A1 Sep. 9, 2010

(30) Foreign Application Priority Data

Dec. 7, 2007  (JP) ................................. 2007-317376
Oct. 22, 2008  (JP) ................................. 2008-271880

(51) Int. Cl.
*C08K 5/00* (2006.01)
(52) U.S. Cl. ......................................... 524/83; 524/526
(58) Field of Classification Search .................... 524/83, 524/526
See application file for complete search history.

(56) References Cited

U.S. PATENT DOCUMENTS

| 5,594,052 | A | 1/1997 | D'Sidocky et al. |
| 5,744,552 | A | * | 4/1998 | D'Sidocky et al. ......... 525/332.6 |
| 2002/0049294 | A1 | 4/2002 | Shiina |
| 2003/0105212 | A1 | 6/2003 | Lukich et al. |
| 2008/0009570 | A1 | 1/2008 | Miyazaki |

FOREIGN PATENT DOCUMENTS

| DE | 696 08 198 T2 | 12/2000 |
| JP | 3-7743 A | 1/1991 |
| JP | 7-102115 A | 4/1995 |
| JP | 2002-20550 A | 1/2002 |
| JP | 2002-97309 A | 4/2002 |
| JP | 2002-146102 A | 5/2002 |
| JP | 2003-213041 A | 7/2003 |
| JP | 2004-91505 A | 3/2004 |
| JP | 2007-63245 A | 3/2007 |
| JP | 2007-161819 A | 6/2007 |
| JP | 2007-277289 A | 10/2007 |
| JP | 2008-31427 A | 2/2008 |
| JP | 2008-208309 A | 9/2008 |
| JP | 2008-308517 A | 12/2008 |

OTHER PUBLICATIONS

German Office Action, dated Nov. 24, 2011, for German Application No. 11 2008 003 343.9.

* cited by examiner

*Primary Examiner* — Peter D Mulcahy
(74) *Attorney, Agent, or Firm* — Birch, Stewart, Kolasch & Birch, LLP.

(57) ABSTRACT

The present invention provides to a rubber composition for a breaker topping including 15 to 50 parts by weight of carbon black and 5 to 50 parts by weight of silica based on 100 parts by weight of a rubber component (provided that a butadiene rubber containing 1,2-syndiotactic polybutadiene crystals is not included) including 10 to 45% by weight of a modified butadiene rubber and/or a modified styrene-butadiene rubber and 55 to 90% by weight of a natural rubber and/or an isoprene rubber for the purpose of improving low fuel cost while keeping rigidity, elongation at break and peel strength at high level.

10 Claims, No Drawings

RUBBER COMPOSITION FOR BREAKER TOPPING

TECHNICAL FIELD

The present invention relates to a rubber composition for a breaker topping.

BACKGROUND ART

The improvement of low fuel cost is required for a rubber composition for a breaker topping, while keeping rigidity, elongation at break and peel strength at high level.

Usually, when sulfur is used as a vulcanizing agent for a diene rubber used for a rubber composition for a breaker topping and vulcanization at high temperature is carried out, polysulfide bond linking between crosslinking points is cleaved and reversion (vulcanization return) occurs. When the reversion occurs, the properties of vulcanized articles are lowered and it has been difficult to obtain objective physical properties.

As a method of suppressing the reversion, a method of reducing the content of sulfur is known. However, in this case, there have been problems that time is required for vulcanization speed, the productivity of a vulcanized rubber is lowered and the adhesion with a steel cord is occasionally lowered. Further, as a method of suppressing the reversion, a method of including synthetic rubbers such as a styrene-butadiene rubber (SBR) and a butadiene rubber (BR) is known. However, in this case, there have been problems that fracture strength is lowered and durability is lowered.

Accordingly, it is required for the rubber composition for a breaker topping that the reversion is suppressed without lowering adhesion property and fracture strength. On the other hand, request for low fuel cost has been recently enhanced and the breaker topping is also desired to further improve low fuel cost.

As a method of improving the low fuel cost, a method of reducing loss tangent (tan δ) by reducing the content of fillers such as carbon black and silica has been known. However, in this case, there has been problems that complex elastic modulus (E*) is lowered and rigidity is lowered.

Consequently, it is desired for the rubber composition for a breaker topping that tan δ is reduced without lowering rigidity.

As described above, it is desired for the rubber composition for a breaker topping to suppress the reversion and reduced tan δ without lowering adhesion property, fracture strength and rigidity. But nothing is really realized yet.

Japanese Unexamined Patent Publication No. 2007-277289 discloses a rubber composition for a breaker topping including rubber components containing a butadiene rubber containing 2.5 to 20% by weight of 1,2-syndiotactic polybutadiene crystals and a modified butadiene rubber and/or a modified styrene-butadiene rubber, in order to provide a rubber composition for a breaker topping capable of improving low fuel cost while keeping rigidity, elongation at break and peel strength at high level. However, the improvement of strength at break, in particular, elongation at break (EB) and low heat build-up (low tan δ), is susceptible to improvement.

DISCLOSURE OF INVENTION

It is the purpose of the present invention to provide a rubber composition for a breaker topping capable of improving low fuel cost while keeping rigidity, elongation at break and peel strength at high level.

The present invention relates to a rubber composition for a breaker topping including 15 to 50 parts by weight of carbon black and 5 to 50 parts by weight of silica based on 100 parts by weight of a rubber component (provided that a butadiene rubber containing 1,2-syndiotactic polybutadiene crystals is not included) including 10 to 45% by weight of a modified butadiene rubber and/or a modified styrene-butadiene rubber and 55 to 90% by weight of a natural rubber and/or an isoprene rubber.

The rubber composition for a breaker topping preferably contains 1.0 to 3.0 parts by weight of benzothiazolyl sulfenamide represented by the chemical formula (1):

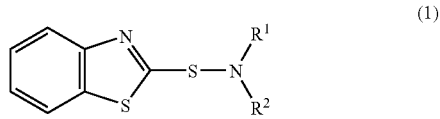

(1)

(wherein $R^1$ is a hydrocarbon group having 1 to 16 carbons and $R^2$ is a hydrocarbon group having 1 to 16 carbons or a benzothiazolyl sulfide group) based on 100 parts by weight of the rubber component.

$R^1$ and $R^2$ are preferably a linear hydrocarbon group having a branch structure having 4 to 16 carbons in the chemical formula (1):

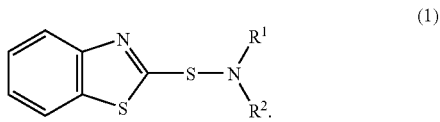

(1)

BEST MODE FOR CARRYING OUT THE INVENTION

The rubber composition for a breaker topping of the present invention contains a rubber component.

The rubber component included in the rubber composition for a breaker topping is described.

The rubber component is a rubber component (provided that a butadiene rubber containing 1,2-syndiotactic polybutadiene crystals is not included) including 10 to 45% by weight of a modified butadiene rubber and/or a modified styrene-butadiene rubber and 55 to 90% by weight of a natural rubber and/or an isoprene rubber.

The rubber component of the present invention does not include the butadiene rubber containing 1,2-syndiotactic polybutadiene crystals.

Since the butadiene rubber containing 1,2-syndiotactic polybutadiene crystals is hardly compatibilized with other diene rubbers (for example, a natural rubber and an isoprene rubber), it is preferable for pursuing low tan δ that the butadiene rubber containing 1,2-syndiotactic polybutadiene crystals is not used and a modified butadiene rubber (modified BR) is used. Further, the component of 1,2-syndiotactic polybutadiene crystals make dispersibility in a rubber difficult with respect to the butadiene rubber containing 1,2-syndiotactic polybutadiene crystals.

The modified butadiene rubber (modified BR) is described.

The rubber composition for a breaker topping of the present invention includes the modified BR as a rubber component because it can improve low heat build-up.

As the modified BR, those that are obtained by carrying out the polymerization of 1,3-butadiene by a lithium initiator and then adding a tin compound and in which the terminal of the modified BR molecule is bonded with tin-carbon bond are preferable.

The lithium initiator includes lithium compounds such as an alkyl lithium, aryl lithium, vinyl lithium, organic tin lithium and organic nitrogen lithium compound and lithium metal. The modified BR with high vinyl and low cis content can be prepared by using the lithium initiator as the initiator of the modified BR.

The tin compound includes tin tetrachloride, butyltin trichloride, dibutyltin dichloride, dioctyltin dichloride, tributyltin chloride, triphenyltin chloride, diphenyl dibutyltin, triphenyltin ethoxide, diphenyl dimethyltin, ditolyltin chloride, diphenyltin dioctanoate, divinyl diethyltin, tetrabenzyltin, dibutyltin distearate, tetraallyltin and p-tributyltin styrene. These tin compounds may be used alone and at least two kinds may be used in combination.

The content of tin atom in the modified BR is preferably at least 50 ppm and more preferably at least 60 ppm. When the content of tin atom is less than 50 ppm, an effect for promoting the dispersion of carbon black in the modified BR is little and tan δ tends to be increased. Further, the content of tin atom is preferably at most 3000 ppm, more preferably at most 2500 ppm and further preferably at most 250 ppm. When the content of tin atom exceeds 3000 ppm, the extrusion processability of kneaded articles tends to be deteriorated, because the cohesiveness of the kneaded articles is bad and edge is not arranged.

The molecular weight distribution (Mw/Mn) of the modified BR is preferably at most 2 and more preferably at most 1.5. When the Mw/Mn of the modified BR exceeds 2, the dispersibility of carbon black is deteriorated and tan δ is increased.

Further, the modified BR may be a modified butadiene rubber (modified BR) modified with a compound represented by the chemical formula (2):

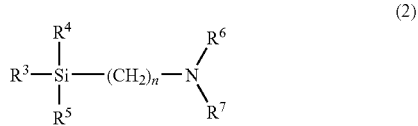

(2)

(wherein $R^3$, $R^4$ and $R^5$ are an alkyl group, a silyloxy group, an acetal group, a carboxyl group, a mercapto group or a derivative thereof, $R^6$ and $R^7$ are a hydrogen group or an alkyl group and n represents an integer).

In the above-mentioned chemical formula (2) of the compound for modifying a butadiene rubber, $R^3$, $R^4$ and $R^5$ are same or different and either is preferably R— or RO— (R is a monovalent hydrocarbon group having 1 to 18 carbons).

The example of the monovalent hydrocarbon group R includes an alkyl group having 1 to 18 carbons, an alkenyl group having 2 to 8 carbons, an aryl group having 6 to 18 carbons and an aralkyl group having 7 to 18 carbons.

The alkyl group and alkenyl group may be either of linear, branched or ring, and specific examples thereof include, for example, a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group and a cyclohexenyl group.

The aryl group may have substituent groups such as a lower alkyl group on an aromatic ring, and specific example thereof includes a phenyl group, a tolyl group, a xylyl group and a naphthyl group.

The aralkyl group may have substituent groups such as a lower alkyl group on an aromatic ring, and specific example thereof includes a benzyl group, a phenethyl group and a naphthylmethyl group.

$R^3$, $R^4$ and $R^5$ may be same or different but the same is preferable because it is easily synthesized and easily available and low fuel cost is good. $R^3$, $R^4$ and $R^5$ are preferably an ethoxy group.

n that is the repeating number of a methylene group is 1 to 8, and 1 to 5 because low fuel cost is good.

The specific example of the chemical formula (2) of the compound for modifying a butadiene rubber is not limited and includes aminomethyl trimethoxysilane, aminomethyl triethoxysilane, 2-aminoethyl trimethoxysilane, 2-aminoethyl triethoxysilane, 3-aminopropyl trimethoxysilane and 3-aminopropyl triethoxysilane. Among them, 3-aminopropyl triethoxysilane is preferable because low fuel cost is good.

The modification of the butadiene rubber by the aminosilane compounds can be carried out, for example, by a known method of bringing the aminosilane compound in contact with a butadiene rubber with an alkali metal terminal at room temperature to 100° C. In this case, the modification occurs at the terminal of the butadiene rubber.

As for the modification quantity, it is preferable that a proportion occupied by the modified butadiene rubber modified with the aminosilane compound among whole butadiene rubber molecules is 10 to 80% by weight because the low fuel cost and processability are good.

As the modified butadiene rubber, one having a weight average molecular weight of 300 thousands to 2 millions and further 500 thousands to 1.5 millions is preferable because the balance of low fuel cost with the processability of a rubber is good. Further, vinyl content is also preferably at most 35% by weight.

The bonding quantity of vinyl of the modified BR is preferably at least 5% by weight and more preferably at least 7% by weight. It tends to be difficult to polymerize (produce) the modified BR in which the bonding quantity of vinyl of the modified BR is less than 5% by weight. Further, the bonding quantity of vinyl of the modified BR is preferably at most 50% by weight and more preferably at most 20% by weight. When the bonding quantity of vinyl of the modified BR exceeds 50% by weight, the dispersibility of carbon black is deteriorated and tensile strength tends to be lowered.

The content of the modified BR in the rubber component is at least 10% by weight, preferably at least 15% by weight and more preferably at least 20% by weight because low heat build-up can be attained. Further, the content of the modified BR is at most 45% by weight, preferably at most 40% by weight and more preferably at most 35% by weight because strength at break is superior.

The modified styrene-butadiene rubber (modified SBR) can express elongation at break (EB) sustainable for real use and durability so far as it is a polymer with low styrene content, high vinyl structure and low Tg. However, in case of condition in which complex elastic modulus (E*) (rigidity) and reversion countermeasure are unnecessary, the modified BR than the modified SBR is preferably used because the low heat build-up (low tan δ) and crack growth resistance can be efficiently attained. With respect to the modified SBR, a styrene component lowers strength at break and tends to raise Tg in the rubber. But the modified BR is low in Tg because of a reason peculiar to a butadiene skeleton and can be preferably used for attaining low heat build-up (low tan δ) because a modifying agent at terminals forms a strong bond with carbon and the dispersion of carbon can be also promoted.

The modified styrene-butadiene rubber (modified SBR) is described.

The modified SBR such as HPR 340 manufactured by JSR Co. Ltd. in which the bonding quantity of styrene is little is preferable.

The bonding quantity of styrene of the modified SBR is preferably at least 5% by weight and more preferably at least 7% by weight because reversion property at rubber compounding is superior. Further, the bonding quantity of styrene of the modified SBR is preferably at most 30% by weight and more preferably at most 20% by weight because the low heat build-up is superior.

The modified SBR includes emulsion polymerization-modified SBR (modified E-SBR) and solution polymerization-modified SBR (modified S-SBR). The modified S-SBR is preferable because the bond of a polymer chain with silica is strengthened and tan δ is reduced to be able to improve low fuel cost.

As the modified SBR, those coupled with tin and silicon are preferably used. As the coupling method of the modified SBR, there is mentioned, for example, a method of reacting alkali metal (such as Li) and alkali earth metal (such as Mg) at the molecular chain terminal of the modified SBR with tin halides and silicon halides according to a normal method.

The modified SBR is a (co)polymer obtained by (co)polymerizing conjugated diolefin alone, or conjugated diolefin with an aromatic vinyl compound and has preferably a primary amino group and an alkoxysilyl group.

The primary amino group may be bonded at any of the initiation terminal of polymerization, the termination terminal of polymerization, the main chain of a polymer and the side chain of a polymer. But it is preferably introduced at the initiation terminal of polymerization or the termination terminal of polymerization because energy loss from polymerization terminal is suppressed and hysteresis property can be improved.

The weight average molecular weight (Mw) of the modified SBR is preferably at least 1 million and more preferably at least 1.2 million because adequate fracture property is obtained. Further, the Mw of the modified SBR is preferably at most 2 millions and more preferably 1.8 millions because the viscosity of a rubber is controlled and kneading processing can be easily carried out.

The content of the modified SBR in the rubber component (A) is at least 10% by weight, preferably at least 15% by weight and more preferably at least 20% by weight. When the content of the modified SBR is less than 10% by weight, reversion property is inferior and tan δ tends to be deteriorated. Further, the content of the modified SBR in the rubber component (A) is at most 45% by weight, preferably at most 40% by weight and more preferably at most 35% by weight. When the content of the modified SBR exceeds 45% by weight, strength at break tends to be lowered.

Although the modified SBR has less effect of lowering loss tangent (tan δ) than the modified BR, it has merit capable of improving complex elastic modulus (E*) (rigidity). Consequently, the complex elastic modulus (E*) (rigidity) is improved by using the modified SBR and it is linked with the improvement of durability.

The natural rubber (NR) and isoprene rubber (IR) is described.

The rubber component included in the rubber composition for a breaker topping of the present invention includes a natural rubber (NR) and/or an isoprene rubber (IR) because it can improve strength at break and improve processability.

NR and IR are not specifically limited and those being generally used in the rubber industry can be used.

The content of the NR and/or IR in the rubber component is at least 55% by weight, preferably at least 60% by weight and more preferably at least 65% by weight because strength at break can be improved. Further, the content of the NR and/or IR is at most 90% by weight, preferably at most 85% by weight and more preferably at most 80% by weight because heat build-up property can be improved.

In the present invention, an effect capable of balancing highly the complex elastic modulus, tan δ and strength at break is obtained by including predetermined rubber components.

Further, the rubber components included in the rubber composition for a breaker topping of the present invention may be a rubber components consisting of the modified BR and the natural rubber and/or isoprene rubber.

The rubber composition for a breaker topping of the present invention contains carbon black.

The nitrogen adsorption specific surface area ($N_2SA$) of carbon black is preferably at least 60 $m^2/g$ and more preferably at least 70 $m^2/g$. When the $N_2SA$ of carbon black is less than 60 $m^2/g$, reinforcing property and strength at break tend to be inferior. Further, the $N_2SA$ of carbon black is preferably at most 160 $m^2/g$ and more preferably at most 150 $m^2/g$. When the $N_2SA$ of carbon black exceeds 160 $m^2/g$, heat and damage tend to be easily generated.

The content of carbon black is at least 15 parts by weight, preferably at least 20 parts by weight and more preferably at least 30 parts by weight based on 100 parts by weight of the rubber component. When the content of carbon black is less than 15 parts by weight, strength at break and complex elastic modulus tend to be lowered. Further, the content of carbon black is at most 50 parts by weight and preferably at most 45 parts by weight. When the content of carbon black exceeds 50 parts by weight, tan δ tends to be increased.

The rubber composition for a breaker topping of the present invention contains silica.

Silica is not specifically limited and silica prepared by a wet process or a dry process can be used.

The BET specific surface area (BET) of silica is preferably at least 90 $m^2/g$ and more preferably at least 100 $m^2/g$. When the BET of silica is less than 90 $m^2/g$, adequate reinforcing property tends not to be obtained. Further, the BET of silica is preferably at most 200 $m^2/g$ and more preferably at most 190 $m^2/g$. When the BET of silica exceeds 200 $m^2/g$, tan δ and exothermic property tend to be increased.

The content of silica is at least 5 parts by weight and preferably at least 8 parts by weight based on 100 parts by weight of the rubber component. When the content of silica is less than 5 parts by weight, the improvement effect of strength at break by containing silica tends not to be obtained. Further, the content of silica is at most 50 parts by weight and preferably at most 40 parts by weight. When the content of silica exceeds 50 parts by weight, the improvement effect of strength at break is reduced nevertheless it costs high and the complex elastic modulus tends not to be improved. Namely, when the content of silica is increased, the complex elastic modulus (E*) (rigidity) is lowered, but low tan δ (low fuel cost) can be improved.

When silica is contained, a silane coupling agent may be used in combination with silica.

The silane coupling agent is not specifically limited and those have been conventionally compounded in a rubber composition together with silica can be used without specific limitation. The example of the silane coupling agent includes sulfides series such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl) disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazolyltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane. These silane coupling agents may be used alone and at least two kinds may be used in combination. Among them, bis(3-triethoxysilylpropyl)tetrasulfide and bis(3-triethoxysilylpropyl)disulfide are preferably used.

When the silane coupling agent is contained, the content of the silane coupling agent is preferably at least 5 parts by weight and more preferably at least 6 parts by weight based on 100 parts by weight of silica. When the content of the silane coupling agent is less than 5 parts by weight, silica once dispersed is re-agglomerated before vulcanization and strength at break of a rubber composition tends to be lowered. Further, the content of the silane coupling agent is preferably at most 15 parts by weight and more preferably at most 12 parts by weight. When the content of the silane coupling agent exceeds 15 parts by weight, the silane coupling agent is contained by at least an amount enough for covering the surface of silica, a sulfur atom in the silane coupling agent acts as excessive sulfur, the crosslinking of the rubber composition is excessively promoted and strength at break tends to be lowered.

The rubber composition for a breaker topping of the present invention may contain carbon black and silica alone respectively.

The complex elastic modulus (E*) (rigidity) can be improved by compounding carbon black in the rubber composition for a breaker topping of the present invention and fracture strength (elongation at break (EB) and durability) can be improved by compounding silica. The initial vulcanization speed of the rubber composition can be fastened by compounding carbon black and the initial vulcanization speed of the rubber composition can be slowed by compounding silica. Namely, carbon black and silica are more preferably used in combination because the vulcanization of the rubber composition is slow by compounding only silica and the adhesion property of a cord tends to be greatly deteriorated when DPG (vulcanization accelerating aid) is forcedly used for promoting the vulcanization speed of the rubber composition. Scorch, physical properties and strength at break can be improved in good balance by using carbon black and silica in combination.

When carbon black and silica are used in combination in the rubber composition for a breaker topping of the present invention, they may be suitably adjusted within a range that the content of carbon black is 15 to 50 parts by weight based on 100 parts by weight of the rubber component and the content of silica is 5 to 50 parts by weight based on 100 parts by weight of the rubber component, as illustrated in the fore description.

When carbon black and silica are used in combination in the rubber composition for a breaker topping of the present invention, the total content of carbon black and silica is preferably at least 40 parts by weight and more preferably at least 45 parts by weight based on 100 parts by weight of the rubber component because strength at break and complex elastic modulus (E*) (rigidity) can be maintained or improved. Further, the total content of carbon black and silica is preferably at most 60 parts by weight and more preferably at most 55 parts by weight based on 100 parts by weight of the rubber component because the low heat build-up (low tan δ) can be attained.

The rubber composition for a breaker topping of the present invention includes preferably benzothiazolyl sulfenamide represented by the following chemical formula (1):

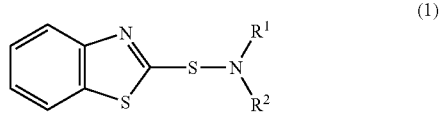

(wherein $R^1$ is a hydrocarbon group having 1 to 16 carbons and $R^2$ is a hydrocarbon group having 1 to 16 carbons or a benzothiazolyl sulfide group) as a vulcanization accelerator.

It can be suppressed by using benzothiazolyl sulfenamide represented by the chemical formula (1) that elongation at break (EB) is deteriorated because of reducing the compounding amount of NR in the rubber composition.

In the benzothiazolyl sulfenamide represented by the chemical formula (1) that can be used for the rubber composition for a breaker topping of the present invention, the preferable hydrocarbon group of $R^1$ and $R^2$ includes tert-butyl (also described as t-butyl), 2-ethylhexyl, 2-methylhexyl, 3-ethylhexyl, 3-ethylhexyl, 3-methylhexyl, 2-ethylpropyl, 2-ethylbutyl, 2-ethylpentyl, 2-ethylheptyl and 2-ethyloctyl.

Further, in the benzothiazolyl sulfenamide represented by the chemical formula (1) that can be used for the rubber composition for a breaker topping of the present invention, the preferable functional group of R² includes a benzothiazolyl sulfide group represented by the following chemical formula:

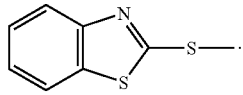

Further, in the benzothiazolyl sulfenamide represented by the chemical formula (1) that can be used for the rubber composition for a breaker topping of the present invention, the preferable functional group of R¹ and R² includes a cyclohexyl group represented by the following chemical formula:

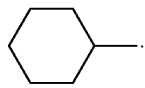

Among them, R¹ and R² may same or different, but R¹ and R² are preferably a linear chain hydrocarbon group having a branched structure with 4 to 16 carbons and R¹ and R² are more preferably a linear chain hydrocarbon group having a branched structure with 6 to 12 carbons (for example, 2-ethylhexyl) because rubber scorch is suppressed and suitable vulcanization speed can be obtained for enhancing dispersibility in the rubber. Further, R¹ and R² are preferably same because the number of production raw materials is reduced, production yield is heightened, purity is heightened and cost can be reduced.

Further, when R¹ is a tert-butyl group, R² is preferably a benzothiazolyl sulfide group by represented by the following chemical formula:

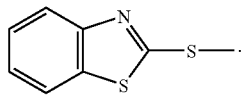

R1 and R2 may same or different, but R1 and R2 include, for example, BEHZ (N,N-di(2-ethylhexyl)-2-benzothiazolyl sulfenamide) available from Kawaguchi Chemical Industry Co., Ltd.:

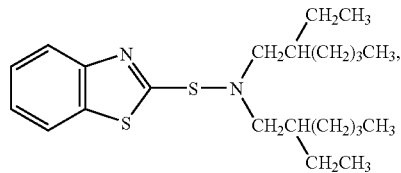

BMHZ (N,N-di(2-methylhexyl)-2-benzothiazolyl sulfenamide) available from Kawaguchi Chemical Industry Co., Ltd.:

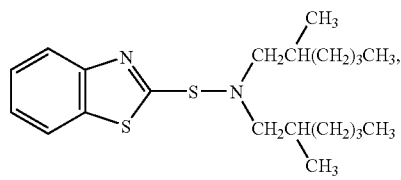

or
SANTCURE TBSI N-tert-butyl-di-(2-benzothiazole-sulfen)imide available from Flexsys Chemicals Sdn Bhd:

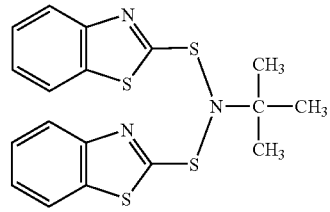

and NOCCELER DZ (N,N'-dicyclohexyl-2-benzothiazolyl sulfenamide) available from OUCHISHINKO CHEMICAL INDUSTRIAL CO., LTD.:

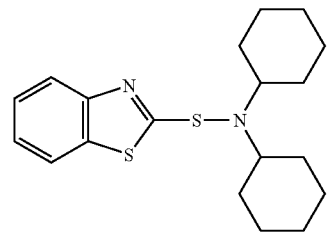

as N,N-dialkyl-2-benzothiazolyl sulfenamide having a linear chain hydrocarbon group having a branched structure with 4 to 16 carbons.

The content of N,N-dialkyl-2-benzothiazolyl sulfonamide represented by the chemical formula (1) is preferably at least 1.0 part by weight and more preferably at least 1.2 parts by weight based on 100 parts by weight of the rubber component because strength at break and complex elastic modulus (E*) (rigidity) can be improved. Further, the content of N,N-dialkyl-2-benzothiazolyl sulfenamide is preferably at most 3.0 parts by weight and more preferably at most 2.5 parts by weight based on 100 parts by weight of the rubber component because elongation at break (EB) (fracture strength) can be improved and adhesion property of a cord can be improved.

The rubber composition for a breaker topping of the present invention preferably contains the cobalt salt of organic acid. The adhesion property of a cord with a rubber can be improved by containing the cobalt salt of organic acid because the cobalt salt of organic acid achieves a role of crosslinking a cord with a rubber. The specific example of the cobalt salt of organic acid includes, for example, cobalt stearate, cobalt naphthenate, cobalt neodecanoate and boron tri (cobalt decanoate). Among them, cobalt stearate is preferable because it is a solid at normal temperature, is superior in stability in air, and it acts as a processing aid (lowers viscosity).

When the cobalt salt of organic acid is contained, the content of the cobalt salt of organic acid is preferably at least 0.05 part by weight converted to cobalt and preferably at least 0.1 part by weight based on 100 parts by weight of the rubber component. When the content of the cobalt salt of organic acid is less than 0.05 part by weight, the (heat and humidity) adhesion property of the plating layer of a steel cord with a rubber tends not to be adequate. Further, the content of the cobalt salt of organic acid is preferably at most 0.8 part by weight converted to cobalt and more preferably at most 0.2 part by weight based on 100 parts by weight of the rubber component. When the content of cobalt stearate exceeds 0.8 part by weight, thermal degradation tends to be generated in either of during processing, during vulcanization and during use.

The rubber composition for a breaker topping of the present invention can suitably contain compounding agents such as zinc oxide, various antioxidants, a softening agent (aromatic oil), sulfur and various vulcanization accelerators that are used in the rubber industry, in addition to the rubber component, carbon black, silica, a silane coupling agent, benzothiazolyl sulfenamide of the vulcanization accelerator represented by the above-mentioned chemical formula (1) and cobalt stearate.

The tire of the present invention is produced by a usual method. Namely, the rubber composition for a breaker topping of the present invention in which the compoundings are, if necessary, suitably compounded is extruded and processed in match with the shape of a breaker of a tire at an unvulcanized state, and the unvulcanized tire is formed by laminating it with other tire members on a tire molding machine with a usual method. The tire of the present invention is obtained by heating and pressuring the unvulcanized tire in a vulcanizer.

According to the rubber composition for a breaker topping of the present invention, elongation at break (EB) (fracture strength) can be improved and low tan δ (low heat build-up) can be attained, namely, the improvement of durability and the improvement of low fuel cost in good balance can be attained by containing the rubber component (provided that a butadiene rubber containing 1,2-syndiotactic polybutadiene crystals is not included) including 10 to 45% by weight of a modified butadiene rubber and/or a modified styrene-butadiene rubber and 55 to 90% by weight of a natural rubber and/or an isoprene rubber.

Further, according to the rubber composition for a breaker topping of the present invention, further low tan δ (low fuel cost) can be expected by suitably controlling compounding amounts with a range of 15 to 50 parts by weight of carbon black and 5 to 50 parts by weight of silica based on 100 parts by weight of the rubber component.

Further, high complex elastic modulus (E*) (rigidity) contributes for steering stability and abrasion resistance at slip angular provision, but does not contribute for tan δ (low fuel cost).

Namely, the rubber composition for a breaker topping of the present invention suppresses lowly the complex elastic modulus (E*) (rigidity) and can attain the improvement of the elongation at break (EB) (fracture strength, durability) and the low tan δ (low rolling resistance, low fuel cost).

EXAMPLES

The present invention will be specifically described based on Examples but the present invention is not limited only to these.

Then, various chemicals used in Examples and Comparative Examples will be described in summary.

Natural Rubber (NR): RSS#3

Modified butadiene rubber (1) (modified BR (1)): Nipol BR 1250 (Lithium initiator: lithium, Content of tin atom: 250 ppm, Mw/Mn: 1.5, Vinyl bond quantity: 10 to 13% by weight) manufactured by ZEON Corporation S-modified butadiene rubber (2) (S-modified BR (2)): Polybutadiene rubber (Vinyl bond quantity: 15% by weight) modified with the following compound:

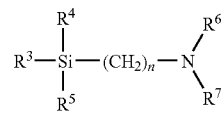

($R^3=R^4=R^5=C_2H_5O-$, $R^6=R^7=H-$, n=3), manufactured by Sumitomo Chemical Co., Ltd.

High cis BR: BR 150B (cis bond butadiene unit quantity: 98.2%) manufactured by UBE Industries, Ltd.

Solution polymerization-modified styrene-butadiene rubber (modified S-SBR): HPR 340 (Styrene bond quantity: 10% by weight, coupled with alkoxysilane and introduced in terminal) manufactured by JSR Co., Ltd.

Carbon black: DIABLACK LH(N326, $N_2SA$: 78 $m^2/g$) available from Mitsubishi Chemical Corporation Silica: Z115 GR (BET: 115 $m^2/g$) available from RHODIA S.A.

Silane coupling agent: Si69 (Bis(3-triethoxysilylpropyl)tetrasulfide) available from Degussa Corporation Cobalt stearate: cost-F (Cobalt content: 9.5% by weight) available from Dainippon Ink and Chemicals Incorporated Aromatic oil: JOMO Process X140 available from Japan Energy Corporation Zinc oxide: Available from Mitsui Mining and Smelting Co., Ltd. Antioxidant: NOCLAC 6C (N-(1,3-dimethylbutyl)-N-phenyl-p-phenylenediamine) available from OUCHISHINKO CHEMICAL INDUSTRIAL CO., LTD.

Sulfur: Crystex HSOT 20 (Insoluble sulfur including 80% by weight of sulfur and 20% by weight of oil) available from Flexsys Chemicals Sdn. Bhd.

Vulcanization accelerator DZ: NOCCELER DZ (N,N'-dicyclohexyl-2-benzothiazolyl sulfenamide) available from OUCHISHINKO CHEMICAL INDUSTRIAL CO., LTD.

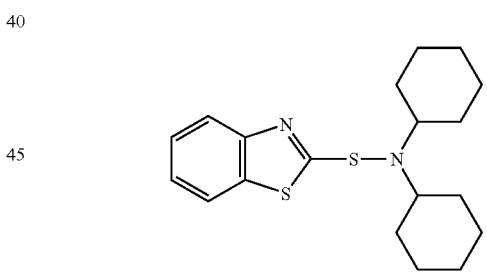

Vulcanization accelerator (1) BEHZ: BEHZ (N,N-di(2-ethylhexyl)-2-benzothiazolyl sulfenamide) available from Kawaguchi Chemical Industry Co., Ltd.

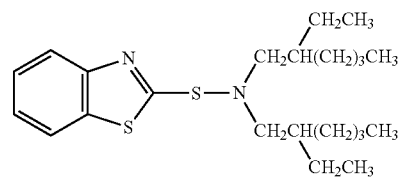

Vulcanization accelerator (2) BMHZ: BMHZ (N,N-di(2-methylhexyl)-2-benzothiazolyl sulfenamide) available from Kawaguchi Chemical Industry Co., Ltd.

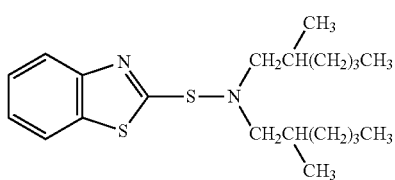

Vulcanization accelerator (3) TBSI: SANTOCURE TBSI (N-tert-butyl-2-benzothiazolyl sulfenamide) ($C_{18}H_{17}N_3S_4$) available from Flexsys Chemicals Sdn. Bhd.

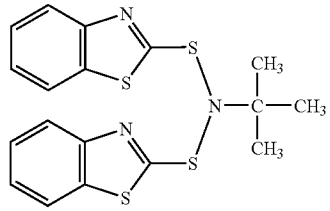

Examples 1 to 18 and Comparative Examples 1 to 5

Chemicals other than sulfur and vulcanization accelerator were kneaded in accordance with compounding prescriptions shown in Tables 1 to 4 using a Banbury mixer to obtain kneaded articles. Then, sulfur and a vulcanization accelerator were added to the kneaded articles obtained and the mixture was kneaded using an open roll to obtain unvulcanized rubbers. The vulcanized rubber compositions of Examples 1 to 18 and Comparative Examples 1 to 5 were prepared by vulcanizing the obtained unvulcanized rubber compositions by press at the condition of 170° C. for 12 minutes.

<Viscoelasticity Test>

Test pieces with a predetermined size were prepared from the vulcanized rubber compositions, and the complex elastic modulus (E*) and loss tangent (tan δ) of the rubber test pieces at 70° C. were measured under the conditions of an initial stain of 10%, a dynamic strain of 2% and a frequency of 10 Hz, using a viscoelasticity spectrometer VES manufactured by Iwamoto Seisakusyo K.K. Here, it is indicated that the larger the E* is, the more superior the rigidity is. And the smaller the tan δ is, the more superior the low fuel cost is.

<Tensile Test>

Tensile test was carried out according to JIS K 6251 "Vulcanized rubber and Thermoplastic rubber—Determination method of Tensile property", using No. 3 dumbbells, and the elongation at break (EB) of the vulcanized rubber test pieces was measured. Here, it is indicated that the larger the EB is, the more superior the fracture strength is.

<Durability Test>

After breaker layers were molded using the unvulcanized rubber compositions for a breaker topping of the present invention, they were laminated with other tire members to mold unvulcanized tires and tires (195/65R15) were produced by vulcanization.

After the tires were charged in an oven and deteriorated at 80° C. for 3 weeks, the tires ran on a drum under the condition of load over loading of 140% against the maximum load (maximum air pressure condition) of JIS Specification and running distances until the generation of abnormality such as bulge at a tread portion were measured. In Table 1, the measurement value of Example 1 was referred to as 100 and they were respectively displayed by indices (durability index). It is indicated that the larger the numerical value is, the more superior the durability of a breaker is.

<Rolling Resistance Test>

The rolling resistance values of tires with 195/65R15 size that were produced using the rubber compositions for a breaker topping of the present invention, in breakers were measured on a stand. Difference of the rolling resistance was calculated on the basis of the value of Comparative Example 1. It is indicated that when the difference of the rolling resistance is a minus value, it can be attained that the larger the absolute value is, the lower the rolling resistance is.

Tables 1 to 4 show the evaluation results of the above-mentioned tests.

TABLE 1

| | Examples | | | | Comparative Examples | | | | |
|---|---|---|---|---|---|---|---|---|---|
| | 1 | 2 | 3 | 4 | 1 | 2 | 3 | 4 | 5 |
| Compounding amount (parts by weight) | | | | | | | | | |
| NR | 75 | 90 | 75 | 75 | 100 | 75 | 95 | 50 | 50 |
| Modified BR | 25 | 10 | 25 | 25 | — | — | 5 | 50 | — |
| High cis BR (1) | — | — | — | — | — | 25 | — | — | — |
| Modified S-SBR | — | — | — | — | — | — | — | — | 50 |
| Carbon black | 45 | 45 | 35 | 45 | 45 | 45 | 45 | 45 | 45 |
| Silica | 10 | 10 | 10 | 10 | 10 | 10 | 10 | 10 | 10 |
| Silane coupling agent | 0.8 | 0.8 | 0.8 | 0.8 | 0.8 | 0.8 | 0.8 | 0.8 | 0.8 |
| Cobalt stearate | 1.5 | 1.5 | 1.5 | 1.5 | 1.5 | 1.5 | 1.5 | 1.5 | 1.5 |
| Aromatic oil | 2 | 2 | 2 | 2 | 2 | 2 | 2 | 2 | 2 |
| Zinc oxide | 8.0 | 8.0 | 8.0 | 8.0 | 8.0 | 8.0 | 8.0 | 8.0 | 8.0 |
| Antioxidant | 1.0 | 1.0 | 1.0 | 1.0 | 1.0 | 1.0 | 1.0 | 1.0 | 1.0 |
| Sulfur (including 20% of oil) | 7.0 | 7.0 | 7.0 | 7.0 | 7.0 | 7.0 | 7.0 | 7.0 | 7.0 |
| Vulcanization accelerator DZ | 1.0 | 1.0 | 1.0 | — | 1.0 | 1.0 | 1.0 | 1.0 | 1.0 |
| Vulcanization accelerator (1) BEHZ | — | — | — | 1.4 | — | — | — | — | — |
| Evaluation result | | | | | | | | | |
| E* | 5.2 | 5.1 | 4.0 | 5.3 | 5.0 | 5.2 | 5.1 | 5.5 | 7.3 |
| tan δ | 0.090 | 0.098 | 0.076 | 0.089 | 0.131 | 0.128 | 0.126 | 0.081 | 0.120 |
| EB (%) | 240 | 290 | 250 | 330 | 350 | 290 | 330 | 190 | 180 |
| Durability index | 110 | 120 | 90 | 140 | 100 | 90 | 95 | 75 | 70 |
| Difference of rolling resistance | −2.3 | −2.0 | −3.5 | −2.3 | Basis | −0.3 | −0.5 | −2.9 | −0.8 |

TABLE 2

|  | Examples | | | | |
| --- | --- | --- | --- | --- | --- |
|  | 4 | 5 | 6 | 7 | 8 |
| Compounding amount (parts by weight) | | | | | |
| NR | 75 | 75 | 75 | 75 | 75 |
| Modified BR (1) | 25 | 25 | 25 | 25 | 25 |
| Carbon black | 45 | 45 | 45 | 45 | 45 |
| Silica | 10 | 10 | 10 | 10 | 10 |
| Silane coupling agent | 0.8 | 0.8 | 0.8 | 0.8 | 0.8 |
| Cobalt stearate | 1.5 | 1.5 | 1.5 | 1.5 | 1.5 |
| Aromatic oil | 2 | 2 | 2 | 2 | 2 |
| Zinc oxide | 8.0 | 8.0 | 8.0 | 8.0 | 8.0 |
| Antioxidant | 1.0 | 1.0 | 1.0 | 1.0 | 1.0 |
| Sulfur (including 20% of oil) | 7.0 | 7.0 | 7.0 | 7.0 | 7.0 |
| Vulcanization accelerator DZ | — | 1.0 | 1.0 | 1.0 | 1.0 |
| Vulcanization accelerator (1) BEHZ | 1.4 | — | — | 1.0 | 2.0 |
| Vulcanization accelerator (2) BMHZ | — | 1.4 | — | — | — |
| Vulcanization accelerator (3) TBSI | — | — | 1.4 | — | — |
| Evaluation result | | | | | |
| E* | 5.3 | 5.3 | 5.6 | 4.7 | 6.3 |
| tan δ | 0.089 | 0.089 | 0.083 | 0.105 | 0.077 |
| EB (%) | 330 | 320 | 300 | 440 | 250 |
| Durability index | 140 | 135 | 130 | 110 | 95 |
| Difference of rolling resistance | −2.3 | −2.3 | −2.6 | −1.3 | −3.5 |

TABLE 3

|  | Examples | | | | | | |
| --- | --- | --- | --- | --- | --- | --- | --- |
|  | 4 | 9 | 10 | 11 | 12 | 13 | 14 |
| Compounding amount (parts by weight) | | | | | | | |
| NR | 75 | 75 | 90 | 80 | 70 | 75 | 75 |
| Modified BR (1) | 25 | — | 10 | 20 | 30 | 15 | — |
| S-modified BR (2) | — | 25 | — | — | — | — | — |
| Modified S-SBR | — | — | — | — | — | 10 | 25 |
| Carbon black | 45 | 45 | 45 | 45 | 45 | 45 | 45 |
| Silica | 10 | 10 | 10 | 10 | 10 | 10 | 10 |
| Silane coupling agent | 0.8 | 0.8 | 0.8 | 0.8 | 0.8 | 0.8 | 0.8 |
| Cobalt stearate | 1.5 | 1.5 | 1.5 | 1.5 | 1.5 | 1.5 | 1.5 |
| Aromatic oil | 2 | 2 | 2 | 2 | 2 | 2 | 2 |
| Zinc oxide | 8.0 | 8.0 | 8.0 | 8.0 | 8.0 | 8.0 | 8.0 |
| Antioxidant | 1.0 | 1.0 | 1.0 | 1.0 | 1.0 | 1.0 | 1.0 |
| Sulfur (including 20% of oil) | 7.0 | 7.0 | 7.0 | 7.0 | 7.0 | 7.0 | 7.0 |
| Vulcanization accelerator DZ | — | 1.0 | 1.0 | 1.0 | 1.0 | 1.0 | 1.0 |
| Vulcanization accelerator (1) BEHZ | 1.4 | 1.4 | 1.4 | 1.4 | 1.4 | 1.4 | 1.4 |
| Evaluation result | | | | | | | |
| E* | 5.3 | 5.2 | 5.1 | 5.3 | 5.5 | 6.2 | 6.8 |
| tan δ | 0.089 | 0.092 | 0.119 | 0.094 | 0.086 | 0.093 | 0.108 |
| EB (%) | 330 | 340 | 500 | 370 | 310 | 300 | 240 |
| Durability index | 140 | 145 | 150 | 160 | 135 | 140 | 130 |
| Difference of rolling resistance | −2.3 | −2.1 | −1.4 | −1.8 | −2.4 | −2.1 | −1.5 |

TABLE 4

|  | Examples | | | | |
| --- | --- | --- | --- | --- | --- |
|  | 4 | 15 | 16 | 17 | 18 |
| Compounding amount (parts by weight) | | | | | |
| NR | 75 | 75 | 75 | 75 | 75 |
| Modified BR (1) | 25 | 25 | 25 | 25 | 25 |
| Carbon black | 45 | 15 | 30 | 50 | 50 |
| Silica | 10 | 40 | 15 | 5 | 10 |
| Silane coupling agent | 0.8 | 3.2 | 2.4 | 0 | 0.8 |
| Cobalt stearate | 1.5 | 1.5 | 1.5 | 1.5 | 1.5 |
| Aromatic oil | 2 | 2 | 2 | 2 | 2 |
| Zinc oxide | 8.0 | 8.0 | 8.0 | 8.0 | 8.0 |
| Antioxidant | 1.0 | 1.0 | 1.0 | 1.0 | 1.0 |
| Sulfur (including 20% of oil) | 7.0 | 7.0 | 7.0 | 7.0 | 7.0 |
| Vulcanization accelerator DZ | — | 1.0 | 1.0 | 1.0 | 1.0 |
| Vulcanization accelerator (1) BEHZ | 1.4 | 1.4 | 1.4 | 1.4 | 1.4 |
| Evaluation result | | | | | |
| E* | 5.3 | 4.0 | 4.8 | 5.7 | 6.4 |
| tan δ | 0.089 | 0.079 | 0.084 | 0.092 | 0.103 |
| EB (%) | 330 | 480 | 370 | 300 | 300 |
| Durability index | 140 | 110 | 125 | 140 | 160 |
| Difference of rolling resistance | −2.3 | −3.4 | −2.6 | −2.2 | −1.4 |

INDUSTRIAL APPLICABILITY

According to the present invention, a rubber composition for a breaker topping capable of improving low fuel cost while keeping rigidity, elongation at break and peel strength at high level can be provided, by containing a predetermined rubber component.

The invention claimed is:

1. A rubber composition for a breaker topping comprising
15 to 50 parts by weight of carbon black,
5 to 50 parts by weight of silica and
1.0 to 3.0 parts by weight of benzothiazolyl sulfenamide represented by the chemical formula (1):

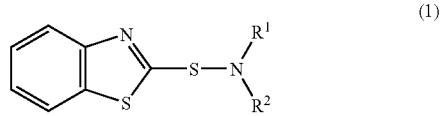

(1)

wherein $R^1$ is a hydrocarbon group selected from tert-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl and 2-ethyloctyl and $R^2$ is a hydrocarbon group selected from tert-butyl, 2-ethylhexyl, 2-methylhexyl, 3-ethylhexyl, 3 methylhexyl, 2-ethylpropyl, 2-ethylbutyl, 2-ethylpentyl, 2-ethylheptyl and 2-ethyloctyl or a benzothiazolyl sulfide group, based on 100 parts by weight of a rubber component (provided that a butadiene rubber containing 1,2-syndiotactic polybutadiene crystals is not included) consisting of
10 to 45% by weight of a modified butadiene rubber and/or a modified styrene-butadiene rubber and
55 to 90% by weight of a natural rubber and/or an isoprene rubber,
wherein the modified butadiene rubber is the modified butadiene rubber obtained by carrying out the polymerization of 1,3-butadiene by a lithium initiator and then adding a tin compound or the modified butadiene rubber modified with a compound represented by the formula (2):

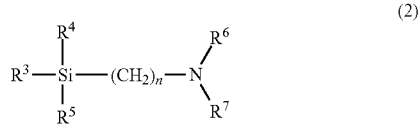

(2)

wherein $R^3$, $R^4$ and $R^5$ are an alkyl group, a silyloxy group, an acetal group, a carboxyl group, a mercapto group or a derivative thereof, $R^6$ and $R^7$ are a hydrogen group or an alkyl group and n represents an integer, and wherein the modified styrene-butadiene rubber is the modified styrene-butadiene rubber coupled with tin and silicon or the modified styrene-butadiene rubber having a primary amino group and an alkoxysilyl group.

2. The rubber composition for a breaker topping of claim 1, wherein the benzothiazolyl sulfenamide is N,N-di(2-ethylhexyl)-2-benzothiazolyl sulfenamide, N,N-di(2-methylhexyl)-2-benzothiazolyl sulfenamide or N-tert-butyl-di-(2-benzothiazolesulfen)imide.

3. The rubber composition for a breaker topping of claim 1, wherein the modified butadiene rubber and/or the modified styrene-butadiene rubber is the modified butadiene rubber modified with a compound selected from a group consisting of aminomethyl trimethoxysilane, aminomethyl triethoxysilane, 2-aminoethyl trimethoxysilane, 2-aminoethyl triethoxysilane, 3-aminopropyl trimethoxysilane and 3-aminopropyl triethoxysilane.

4. The rubber composition for a breaker topping of claim 1, wherein $R^1$ of the chemical formula (1) is a hydrocarbon group selected from tert-butyl, 2-methylhexyl, 3-ethylhexyl, 3-methylhexyl, 2-ethylpropyl, 2-ethylbutyl, 2-ethylpentyl, 2-ethylheptyl and 2-ethyloctyl and $R^2$ of the chemical formula (1) is a hydrocarbon group selected from tert-butyl, 2-methylhexyl, 3-ethylhexyl, 3-methylhexyl, 2-ethylpropyl, 2-ethylbutyl, 2-ethylpentyl, 2-ethylheptyl and 2-ethyloctyl.

5. The rubber composition for a breaker topping of claim 1, wherein the benzothiazolyl sulfenamide is N,N-di(2-methylhexyl)-2-benzothiazolyl sulfenamide.

6. A tire having a breaker with a topping formed from the rubber composition of claim 1.

7. A tire having a breaker with a topping formed from the rubber composition of claim 2.

8. A tire having a breaker with a topping formed from the rubber composition of claim 3.

9. A tire having a breaker with a topping formed from the rubber composition of claim 4.

10. A tire having a breaker with a topping formed from the rubber composition of claim 5.

\* \* \* \* \*